United States Patent [19]

Bridges

[11] Patent Number: 5,400,663
[45] Date of Patent: Mar. 28, 1995

[54] INTEGRAL TORSION SENSOR

[76] Inventor: Robert H. Bridges, 28586 LaCumbre, Laguna Niguel, Calif. 92673

[21] Appl. No.: 148,007

[22] Filed: Nov. 5, 1993

[51] Int. Cl.6 .................................................. G01L 3/02
[52] U.S. Cl. ........................... 73/862.326; 73/862.321
[58] Field of Search ................... 73/862.191, 862.321, 73/862.326; 901/46, 34; 414/5; 623/57; 464/92, 89; 403/79, 161

[56] References Cited

U.S. PATENT DOCUMENTS

| | | | |
|---|---|---|---|
| 380,294 | 3/1888 | Murdock | 73/862.321 |
| 2,607,219 | 8/1952 | Millard et al. | 73/862.321 X |
| 3,289,495 | 12/1966 | Leto et al. | 73/862.321 X |
| 3,380,287 | 4/1968 | Onyskin | 73/862.191 X |
| 3,982,419 | 9/1976 | Boys | 73/139 |
| 4,430,566 | 2/1984 | Searle | 256/231 SE |
| 4,432,245 | 2/1984 | Hattori et al. | 73/862.321 |
| 4,555,956 | 12/1985 | Reich | 73/862.321 |
| 4,600,357 | 7/1986 | Coules | 73/862.326 X |
| 4,787,255 | 11/1988 | Guay | 73/862.326 |
| 4,866,993 | 9/1989 | Schumaker | 73/862.33 |
| 4,899,953 | 2/1990 | Toda | 73/862.321 X |
| 4,905,524 | 3/1990 | Dressler | 73/862.32 |
| 4,907,460 | 3/1990 | Taniguchie | 73/862.33 |
| 4,922,761 | 5/1990 | Onishi | 73/862.33 |
| 5,133,216 | 7/1992 | Bridges | 73/862.321 |
| 5,193,401 | 3/1993 | Bridges | 73/862.321 X |
| 5,195,383 | 3/1993 | Tanaka et al. | 73/862.326 X |

FOREIGN PATENT DOCUMENTS

| | | | |
|---|---|---|---|
| 2100487 | 7/1972 | Germany | 73/862.321 |
| 7157861 | 9/1982 | Japan | 73/862.321 |
| 195829 | 4/1923 | United Kingdom | 73/862.321 |
| 0694778 | 10/1979 | U.S.S.R. | 73/862.326 |

OTHER PUBLICATIONS

Visher et al. Experimental Robotics I, 1990, "Design & Development of Torque-Controlled Joints", pp. 280 to 284.
Holland, Sensors, Mar. 1993, pp. 76 to 78, "A New Magnetoelastic Torque Transducer".

Primary Examiner—Richard E. Chilcot, Jr.
Assistant Examiner—Elizabeth L. Dougherty
Attorney, Agent, or Firm—Walter A. Hackler

[57] ABSTRACT

Apparatus for direct measurement of torque includes a shaft rotatably mounted in a shaft support and a driver collar rotatably mounted to the shaft. A driven collar is fixed to said shaft and concentric with the driver collar and shaft, and a resilient element is disposed between the driver and driven collars, for transferring rotary motion between the driver and driven collars in response to rotation of either the shaft or the driver collar. A sensor, disposed between the driver and driven collars, is provided for measuring an angular displacement of the driver collar relative to the driven collar in order to provide a direct measurement of torque.

14 Claims, 2 Drawing Sheets

INTEGRAL TORSION SENSOR

The present invention provides a novel means to directly measure torsion in a shaft with any combination of shaft direction and torsion direction. Shaft rotation may be continuous or within a limited range of rotation.

Shaft torque measurements are required in a wide range of situations. Some examples are: tightening bolts to a predetermined torque range, controlling tension in continuous process rollers, and monitoring the loading of material handling devices.

Strain gages are used to measure torsion in a shaft by attaching them to a section of the shaft which is designed to angularly distort under a torsion load. Where continuous rotation is present, slip rings or rotary transformers are used to electrically interconnect the strain gages with their signal processing unit.

Strain gages also are incorporated into the supporting structure of the drive motor of the shaft. They measure the shaft torsion by measuring the structure stress due to the reaction of the drive motor.

The angular distortion of a shaft section under a torsion load also can be measured by a series of alternative techniques.

1. Torsion variable differential transformers have magnet segments secured to a shaft made of nonmagnetic material. As the shaft angularly distorts when subject to torsion, the relative position of the magnets shifts and changes the magnetic reluctance. The changes are sensed by the two coils of the transformer.

2. Two angular position sensors are located at two different positions on the shaft. The difference between the readings of the sensors is a measure of the relative angular displacement of the shaft section between two sensors.

3. Magnetoelastic elements have been incorporated into shafts in order to measure torque. Changes in the shaft torque direction and intensity will change the magnetic characteristics of the elements which can be measured by a Hall effect device.

The shaft section used to measure these angular defections under torsion loading may be of different shapes and material, including coiled torsion springs as described in U.S. Pat. No. 3,982,419 to Boys.

Yet another technique is described in U.S. Pat. No. 4,866,993 to Shumacher, which includes a torsionally compliant cylindrical means concentrically attached between the driven shaft and an external concentric torquing means. The torsional compliant means angular deformation is measured by rotationally balanced sensors for a representation of the torque being transmitted.

The present invention provides a compact means to make direct torque measurements in rotating shafts. In comparison to the prior art methods which measure the angular distortion of a shaft section, the present invention requires a significantly smaller amount of shaft length. Furthermore, smaller and/or less costly components are used.

SUMMARY OF THE INVENTION

In accordance with the present invention, a driver collar is secured by bearings to the shaft in order to provide for independent rotation of the driver collar relative to the shaft while restricting any lateral movement.

Adjacent to the driver collar is a driven collar which is secured to the shaft.

A torsion spring of less than one turn is disposed concentric with the shaft and has one end thereof secured to the driver collar and another end thereof secured to the driven collar.

Rotational motion of the driver collar is transmitted to the shaft through the torsion spring and then the driven collar. The torsion spring will distort in a direction and to a degree based upon the amount of torque present and its direction, and there will be an angular displacement of the driver collar relative to the driven collar.

An angular displacement sensor is placed in a gap in the torsion spring with one element mounted on the driver collar and the second element mounted on the driven collar. The output of this angular displacement sensor is converted into a measurement of the shaft torque and the direction of the torque.

Should the shaft become the driver member, there will also be an angular displacement of the driver collar relative to the driven collar which also can be measured by the angular position sensor.

The above-mentioned and other features and objectives of the present invention and its use will best be understood by reference to the following descriptions of embodiments of the invention, when considered in conjunction with the accompanying drawings.

DETAILED DESCRIPTION

Figure 1:
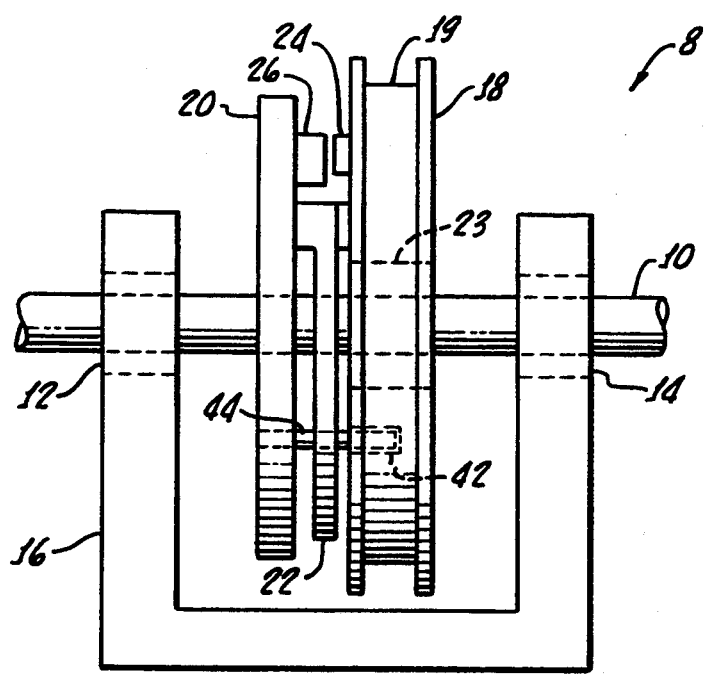
FIG. 1 is a simplified side view of a shaft drive assembly.

As shown in FIG. 1, in an integral torsion sensor 8 in accordance with the present invention, a shaft 10 is supported by bearings 12, 14 in shaft support 16. Driver collar 18 rotates around shaft 10 and driven collar 20 is secured to shaft 10. Rotary motion is imparted to driver collar 18 by a drive belt (not shown) via groove 19, and in turn this rotary motion is imparted to driven collar 20 by torsion spring 22. Driven collar 20 in turn imparts this rotary motion to shaft 10. Also not shown is a load which is connected to shaft 10.

Figure 2:
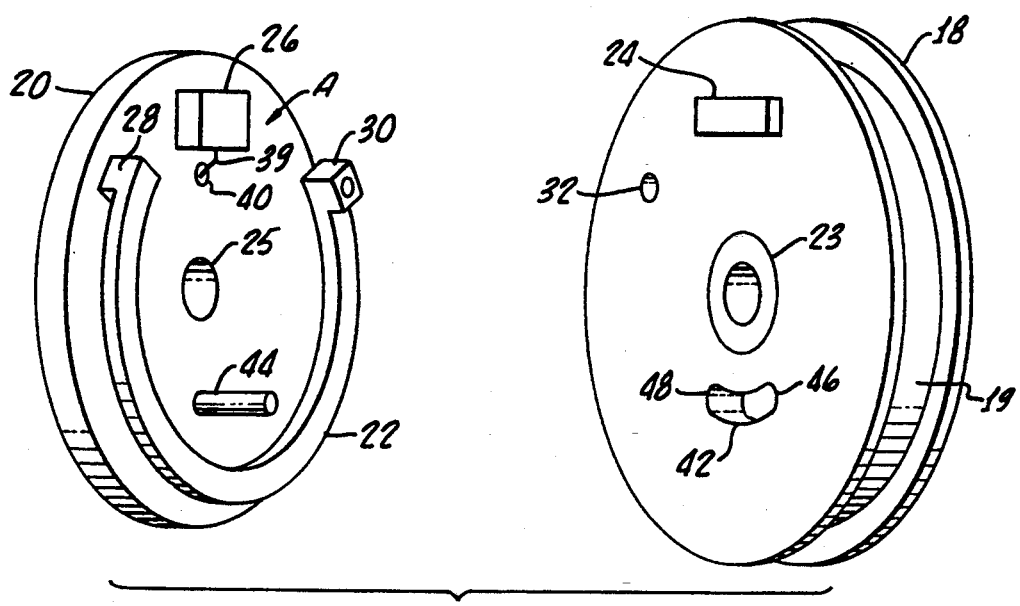
FIG. 2 is a simplified perspective view of the major components partially disassembled.

Additional details are shown in FIG. 2's perspective views of the opposing faces of driver collar 18 and driven collar 20 which face each other when they are mounted on shaft 10. Driver collar 18 is rotationally secured to shaft 10 by bearing 23. Driven collar 20 is secured at bore 25 to common shaft 10. When driver collar 18 and driven collar 20 are assembled to shaft 10, torsion spring 22 is secured at an end 28 to driven collar 20 as shown in FIG. 2 and at an end 30 to mount access 32 of driver collar 18. As shown in FIG. 1, there is sufficient clearance between driver collar 18 and driven collar 20 so that torsion spring 22 only has contact at these ends 28, 30.

As the drive belt imparts rotary motion to driver collar 18, the rotary motion of driver collar 18 is imparted to driven collar 20 by torsion spring 22. Depending upon the resistance of driven collar 20 and shaft 10 to this rotary motion, torsion spring 22 will distort and there will be a rotational displacement of driver collar 18 relative to driven collar 20. The direction and the degree of this rotational displacement is measured by Hall effect sensor 26 mounted on driven collar 20 in a gap A between ends 28, 30 of the torsion spring 22 and interacting with magnet assembly 24 mounted on driver collar 18.

The leads 39 for the Hall effect sensor 26 are routed through lead access 40. For applications involving limited rotation of shaft 10, flexible lead wires 39 may be used. For applications involving continuous rotation, slip rings (not shown) or equivalent techniques may be used.

Where there is a need for a positive drive above a given torque level, limit slot 42 may be provided in driver collar 18 and limit pin 44 may be secured to driven collar 20. Above a given amount of rotational displacement of driver collar 18 relative to driven collar 20, limit pin 44 will engage either end 46 or end 48 of limit slot 42, depending upon the direction of the rotational displacement.

Any alternative power transmission means that can effect rotary motion of the driver collar can be substituted for the drive belt means mentioned herein. The mounting of the Hall effect sensor and the interactive magnets may be reversed and other means for measuring rotation displacement (not shown) can be substituted.

Should a torque be introduced by shaft 10 and driven collar 20, the displacement of driver collar 18 relative to driven collar 20 would similarly be measured by Hall effect sensor 26 and magnet assembly 24.

Figure 3:
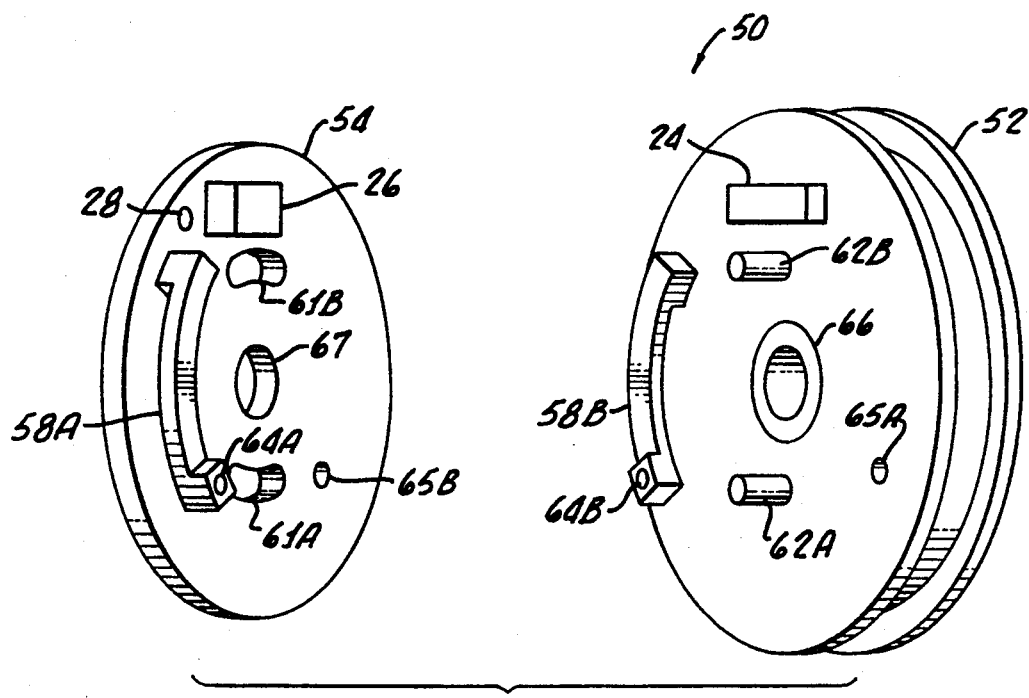
FIG. 3 is similar to FIG. 2, showing an alternative configuration with symmetrical torsion loading.

FIG. 3 shows an alternative configuration 50 of the present invention which provides for a balanced transfer of torque. Driven collar 20 of FIG. 1 is replaced by driven collar 54 and driver collar 18 of FIG. 1 is replaced by driver collar 52. Torsion spring 18 of FIG. 1 is replaced by torsion springs 58A and 58B, and the Hall effect sensor 26 and magnet assembly 24 are as described in FIG. 2.

FIG. 3, as in FIG. 2, shows the alternative embodiment 50 partially disassembled. Driven collar 54, when assembled, would be secured to shaft 10 at bore 67. Driver collar 52 would be rotationally secured to shaft 10 with bearing 66. Torsion spring 58A is shown secured to driven collar 54 and, when fully assembled, spring end 64A would be secured to access 65A of driver collar 52. Similarly, torsion spring 58B is shown secured to driver collar 52 and, when fully assembled, spring end 64B would be secured to access 65B of driven collar 54.

To provide a positive drive above a given torque, limit pin 62A is inserted into limit slot 61a and limit pin 62B is inserted into limit slot 61B.

Not shown in FIG. 3 are dynamic balancing weights to offset the weight of Hall effect sensor 26 on driven collar 54 and the weight of magnet assembly 24 on driver collar 52.

Figure 4:
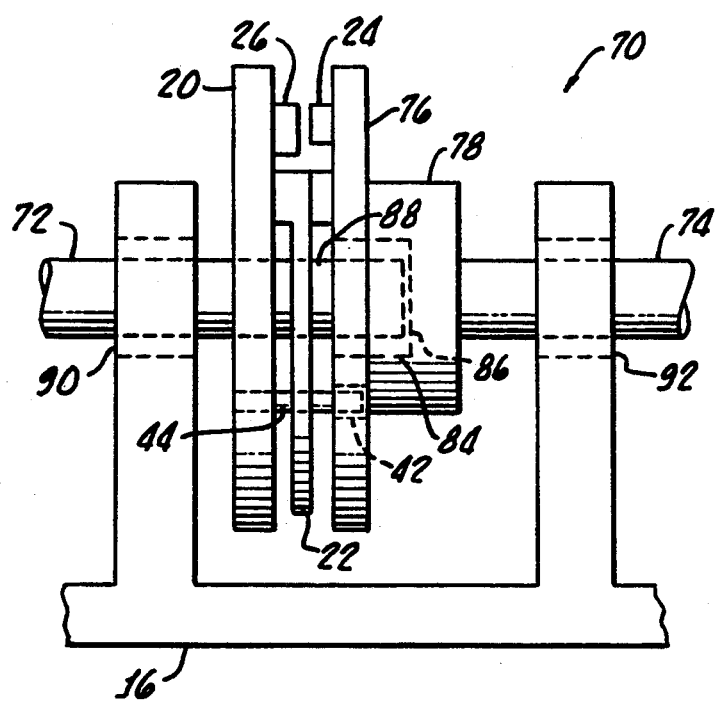
FIG. 4 is similar to FIG. 1, showing an alternative embodiment of the present invention.

FIG. 4 shows yet another alternative embodiment 70 of the present invention. This embodiment 70 provides for the measurement of the torque being transmitted between two in-line shafts 72 and 74. Also, driver collar 18 of FIG. 1 is replaced by driver collar 76, which is secured to hub 78, which in turn is secured to shaft 74. Bearing 84, secured to a bore 86 in hub 78, supports end 88 of shaft 72, along with bearings 90, 92 in the shaft support 16, and keeps shafts 72 and 74 in-line while not directly driving each other.

Torque can be introduced by either shaft 72 or shaft 74 with the displacement of driver collar 76 relative to driven collar 20 continuing to be measured by Hall effect sensor 26 and magnet assembly 24.

The present invention as hereinabove described is directed to an apparatus for the direct measurement of torque in a shaft with continuous rotation as in power transmission systems or in shafts with limited reversible rotation, as in material handling devices; and while specific arrangements have been described for the purpose of illustrating the manner in which the invention may be used to advantage, it should be appreciated that the invention is not limited thereto. Accordingly, any and all modifications, variations, or equivalent arrangements, which may occur to those skilled in the art, should be considered to be within the scope of the present invention as defined in the appended claims.

What is claimed is:

1. Apparatus for direct measurement of torque comprising:
 a shaft rotatably mounted in a shaft support and including means for coupling said shaft for rotation to a first external device;
 a driver collar rotatably mounted to said shaft and including means for coupling said driver collar for rotation to a second external device;
 a driven collar fixed to said shaft and concentric with said driver collar and shaft;
 resilient means, disposed between said driver and driven collars, for transferring rotary motion between the driver and driven collars in response to rotation of either the shaft, by the first external device, or, in response to rotation of the driver collar, by the second external device; and
 sensor means, disposed between the driver and driven collars, for measuring an angular displacement of the driver collar relative to the driven collar in order to provide a direct measurement of torque, said sensor means being mounted in a rotational plane of the resilient means and in a clearance space not occupied by the resilient means, said sensor means comprising two interacting components, one of the two components being mounted on the driver collar and a second of the two components being mounted on the driven collar.

2. The apparatus of claim 1 wherein the sensor means measures displacement in two rotational directions.

3. The apparatus of claim 1 further comprising stop means for limiting torque applied to the resilient means during transfer of rotary motion between the driver and driven collars and for the direct transfer of rotary motion between the driver collar and driven collar.

4. The apparatus of claim 1 wherein the resilient means comprises at least one torsion spring having less than one turn and having one end secured to the driver collar and another end secured to the driven collar and said sensor means is disposed between the ends of the torsion spring.

5. The apparatus of claim 1 wherein the resilient means comprises a first and a second torsion spring, each having less than one turn and each having one end secured to the driver collar and another end secured to the driven collar and said sensor means is disposed between the one end of the first torsion spring and the one end of the second torsion spring.

6. The apparatus of claim 5 wherein the sensor means measures displacement in two rotational directions.

7. The apparatus of claim 5 further comprising stop means for limiting torque applied to the resilient means during transfer of rotary motion between the driver and driven collars and for the direct transfer of rotary motion between the driver collar and driven collar.

8. Apparatus for direct measurement of torque comprising:
- a first shaft rotatably mounted in a shaft support and including means for coupling said first shaft for rotation to a first external device;
- a second shaft rotatably mounted in said support coaxial with said first shaft and including means for coupling said second shaft for rotation to a second external device;
- a driver collar coaxially fixed to said first shaft;
- a driven collar fixed to said second shaft and concentric with said driver collar and said first and second shafts;
- resilient means, disposed between said driver and driven collars, for transferring rotary motion between the driver and driven collars in response to rotation of either the first shaft, by the first external device, or, in response to rotation of the second shaft, by the second external device; and
- sensor means, disposed between the driver and driven collars, for measuring an angular displacement of the driver collar relative to the driven collar in order to provide a direct measurement of torque, said sensor means being mounted in a rotational plane of the resilient means and in a clearance space not occupied by the resilient means, said sensor means comprising two interacting components, one of the two components being mounted on the driver collar and a second of the two components being mounted on the driven collar.

9. The apparatus of claim 8 wherein the sensor means measures displacement in two rotational directions.

10. The apparatus of claim 8 further comprising stop means for limiting torque applied to the resilient means during transfer of rotary motion between the driver and driven collars and for the direct transfer of rotary motion between the driver and driven collars.

11. The apparatus of claim 8 wherein the resilient means comprises at least one torsion spring having less than one turn and having one end secured to the driver collar and another end secured to the driven collar and said sensor means is disposed between the ends of the torsion spring.

12. The apparatus of claim 8 wherein the resilient means comprises a first and a second torsion spring, each having less than one turn and each having one end secured to the driver collar and another end secured to the driven collar and said sensor means is disposed between the one end of the first torsion spring and the one end of the second torsion spring.

13. The apparatus of claim 12 wherein the sensor means measures displacement in two rotational directions.

14. The apparatus of claim 12 further comprising stop means for limiting torque applied to the resilient means during transfer of rotary motion between the driver and driver collars and for the direct transfer of rotary motion between the driver and driven collars.

* * * * *